(12) United States Patent
Iwata et al.

(10) Patent No.: US 6,983,681 B2
(45) Date of Patent: Jan. 10, 2006

(54) SLIDING MEMBER

(75) Inventors: Hideki Iwata, Inuyama (JP); Takuya Tanaka, Inuyama (JP); Weixing Zhong, Inuyama (JP); Takeshi Shindo, Inuyama (JP); Kotaro Kashiyama, Inuyama (JP)

(73) Assignee: Daido Metal Company Ltd., Nagoya (JP)

( * ) Notice: Subject to any disclaimer, the term of this patent is extended or adjusted under 35 U.S.C. 154(b) by 8 days.

(21) Appl. No.: 10/783,868

(22) Filed: Feb. 20, 2004

(65) Prior Publication Data

US 2004/0166341 A1    Aug. 26, 2004

(30) Foreign Application Priority Data

Feb. 20, 2003    (JP) ............................. 2003-041936

(51) Int. Cl.
F04B 27/08    (2006.01)
B32B 27/04    (2006.01)

(52) U.S. Cl. ..................................... 92/12.2
(58) Field of Classification Search ................. 91/499; 92/12.2, 71; 417/269
See application file for complete search history.

(56) References Cited

U.S. PATENT DOCUMENTS

| | | | |
|---|---|---|---|
| 3,652,408 A | 3/1972 | Korshak et al. | |
| 3,721,625 A | 3/1973 | McConnell et al. | |
| 5,384,352 A | 1/1995 | Andres et al. | |
| 5,391,605 A | 2/1995 | Andres et al. | |
| 5,531,195 A * | 7/1996 | Onoda et al. ............... | 277/442 |
| 6,863,994 B2 * | 3/2005 | Tanaka et al. .............. | 428/626 |
| 6,866,421 B2 * | 3/2005 | Tanaka et al. .............. | 384/300 |
| 2003/0185475 A1 * | 10/2003 | Iwata et al. ................. | 384/420 |
| 2003/0235355 A1 | 12/2003 | Hiramatsu et al. | |
| 2004/0008914 A1 | 1/2004 | Hiramatsu et al. | |

FOREIGN PATENT DOCUMENTS

| | | |
|---|---|---|
| EP | 1 245 641 B1 | 10/2002 |
| GB | 1152963 B1 | 5/1969 |
| GB | 2 374 640 B1 | 10/2002 |
| GB | 2 384 033 B1 | 7/2003 |
| JP | A-4-83914 | 3/1992 |
| JP | A-8-59991 | 3/1996 |
| JP | A-9-79262 | 3/1997 |
| JP | 2003056566 B1 | 2/2003 |
| WO | WO-02/010320 A1 | 2/2002 |

* cited by examiner

OTHER PUBLICATIONS

Search Report, 6 pgs for GB0403259.5.

*Primary Examiner*—Thomas E. Lazo
(74) *Attorney, Agent, or Firm*—Rader, Fishman & Grauer PLLC

(57) ABSTRACT

An object of the present invention is to provide a sliding member which can slide for a longer period of time even in a dry state. In the present invention, sliding layers 3 are provided on the surfaces of a base material 2, and the sliding layer 3 contains polybenzimidazole (PBI) and 1 to 70 vol % of a solid lubricant. Since PBI, which is a thermoplastic resin, has higher heat resistance and also has higher material strength than PAI, PI, and EP, which are the conventionally used thermosetting resins, the wear resistance and the anti-seizure property can be improved and a decrease in material strength caused by high-temperature atmosphere, heat generation at the time of sliding, etc. can be restrained. Furthermore, the initial conformability can be improved because of high elongation percentage. Also, since the sliding layer contains the solid lubricant, the coefficient of friction can be decreased, and hence the anti-seizure property can be enhanced.

17 Claims, 2 Drawing Sheets

SLIDING MEMBER

CROSS-REFERENCE TO RELATED APPLICATIONS

This application claims priority based on Japanese Patent Application No. 2003-041936, filed Feb. 20, 2003, the entirety of which is incorporated herein by reference.

BACKGROUND OF THE INVENTION

The present invention relates to a sliding member provided with a sliding layer on a surface of a base material formed of any of steel, stainless steel, copper-based alloy, aluminum-based alloy, and magnesium-based alloy.

As an example, a sliding member provided with sliding layers on the surfaces of a base material formed of steel has been used, for example, for a swash plate etc. of a swash plate type piston pump (variable displacement pump, compressor, etc.). The swash plate type piston pump is constructed so that a gas in a cylinder is compressed by a piston reciprocating in the cylinder following a rotating swash plate. In the pump of this type, the swash plate slides with respect to a shoe, which is a mating member interposed between the swash plate and the piston. The swash plate of the swash plate type piston pump rotates at a high speed and also receives a high pressure from the shoe.

Conventionally, as the above-described sliding member used for a swash plate type compressor and the like equipment, a sliding member in which coating layers consisting of a solid lubricant using polyamidimide (hereinafter abbreviated to "PAI"), polyimide (hereinafter abbreviated to "PI"), or epoxy (hereinafter abbreviated to "EP") as a binder are formed on both surfaces of a base material has been proposed in JP-A-4-83914, JP-A-9-79262, JP-A-8-59991, etc.

On the other hand, in the above-described sliding member, a lubricating oil is supplied onto the sliding surface, and in particular, in the above-described swash plate type compressor or the like, a mixture of a refrigerant and a refrigerating machine oil, which is a lubricating oil, (refrigerant/refrigerating machine oil mixture) is supplied. Thus, the lubricating oil is supplied onto the sliding surface of sliding member. In a case where the equipment is not used for a long period of time, for example, as in the case of the compressor for an air conditioner, the refrigerant/refrigerating machine oil mixture becomes absent on the sliding surface of sliding member, and hence the sliding surface becomes in a dry state. If the compressor is started in this state, since some period of time is required before the refrigerant/refrigerating machine oil mixture is supplied onto the sliding surface, the sliding member slides in the dry state until the refrigerant/refrigerating machine oil mixture is supplied, so that a high load is applied to the sliding member, and thus the sliding member may seize. Therefore, there has been demanded a sliding member which can slide for a long period of time without seizing even in the dry state before the refrigerant/refrigerating machine oil mixture is supplied sufficiently.

The above-described sliding member in which coating layers formed of a solid lubricant using PAI, PI, EP, etc., which are thermosetting resins, as a binder, are formed on both surfaces of a base material presents a problem in that the base material is exposed in a short period of time by the wear of the sliding layer caused by the use in a dry state, and resultantly seizure occurs. The present invention has been made in view of the above situation, and accordingly an object thereof is to provide a sliding member which can slide for a longer period of time even in a dry state.

SUMMARY OF THE INVENTION

According to the present invention, the following sliding members are provided.

A first aspect; A sliding member in which a sliding layer is provided on a surface of a base material formed of any of steel, stainless steel, copper-based alloy, aluminum-based alloy, and magnesium-based alloy, the sliding layer containing polybenzimidazole and 1 to 70 percent by volume of a solid lubricant.

A second aspect; The sliding member according to a first aspect, wherein the surface of the base material is subjected to a chemical conversion coating, and the sliding layer is provided on the chemical conversion coated surface.

A third aspect; The sliding member according to a first aspect or a second aspect, wherein the solid lubricant is formed of at least one kind of polytetrafluoroethylene, graphite, and molybdenum disulfide.

A fourth aspect; The sliding member according to any one of a first aspect to a third aspect, wherein the sliding layer contains 0.1 to 10 percent by volume of bismuth or/and bismuth alloy.

A fifth aspect; The sliding member according to any one of a first aspect to a fourth aspect, wherein the sliding layer contains 0.1 to 10 percent by volume of an inorganic compound having Mohs' hardness of 4 or less.

A sixth aspect; The sliding member according to any one of a first aspect to a fifth aspect, wherein a bonding layer formed of a thermosetting resin is provided between the base material and the sliding layer.

A seventh aspect; The sliding member according to any one of a first aspect to a sixth aspect, wherein the sliding member is used for a swash plate of a swash plate type piston pump.

In order to achieve the above-described object, the invention described in the above-mentioned a first aspect provides a sliding member in which a sliding layer is provided on a surface of a base material formed of any of steel, stainless steel, copper-based alloy, aluminum-based alloy, and magnesium-based alloy, the sliding layer containing polybenzimidazole and 1 to 70 percent by volume of a solid lubricant. By this configuration, the wear resistance and the anti-seizure property can be improved and a decrease in material strength caused by high-temperature atmosphere, heat generation at the time of sliding, etc. can be restrained because polybenzimidazole (hereinafter abbreviated to "PBI"), which is a thermoplastic resin, has higher heat resistance and also higher material strength (tensile strength etc.) than PAI, PI, and EP, which are the conventionally used thermosetting resins. Furthermore, the initial conformability can be improved because of high elongation percentage. Also, since the sliding layer contains a solid lubricant, the coefficient of friction can be decreased, and hence the anti-seizure property can be enhanced. In this case, if the content of the solid lubricant is less than 1 percent by volume, the effect of improving lubricity due to the solid lubricant can hardly be achieved, and if it exceeds 70 percent by volume, the wear resistance decreases. Therefore, the content of the solid lubricant for the sliding layer is preferably in the range of 1 to 70 percent by volume. The sliding layer is formed so as to have a thickness of 1 to 100 $\mu$m, preferably 3 to 50 $\mu$m.

By subjecting the surface of the base material to chemical conversion coating and providing the sliding layer on the chemical conversion coated surface, adhesion between the base material and the sliding layer is improved, by which the anchoring effect is increased, and also the anti-seizure property and other sliding properties can be improved by a coat produced by the chemical conversion coating even when the sliding layer is worn and hence the base material is exposed (the invention described in a second aspect). In this case, as the chemical conversion coating in the case where the base material is formed of steel, phosphate coating is cited, as the chemical conversion coating in the case where it is formed of stainless steel, a Tufftride coating is cited, as the chemical conversion coating in the case where it is formed of copper-based alloy, an oxide coating is cited, and as the chemical conversion coating in the case where it is formed of aluminum-based alloy or magnesium-based alloy, a chromate coating or non-chromate coating is cited. It is a matter of course that any coating other than the above-described coating can be used.

As the above-described solid lubricant, at least one kind of polytetrafluoroethylene (hereinafter abbreviated to "PTFE"), graphite, and molybdenum disulfide is preferably used (the invention described in a third aspect). The powder diameter of the solid lubricant is preferably 0.1 to 20 μm. If it exceeds 20 μm, an adverse influence is exerted on the surface shape, so that a smooth sliding surface cannot be obtained.

In the invention described in a fourth aspect, the sliding layer contains 0.1 to 10 percent by volume of bismuth or/and bismuth alloy. Bismuth (hereinafter abbreviated to "Bi") or bismuth alloy (hereinafter abbreviated to "Bi alloy") has an effect of improving the anti-seizure property and an effect of forming a transfer film like the properties of lead. If the ratio of Bi or/and Bi alloy to the total quantity of sliding layer composition is lower than 0.1 percent by volume, sufficient frictional abrasion properties cannot be anticipated, and if it exceeds 10 percent by volume, the wear resistance decreases suddenly. Also, the particle diameter of Bi or Bi alloy is preferably 0.1 to 20 μm. If it is smaller than 0.1 μm, sufficient frictional abrasion properties cannot be obtained. If it exceeds 20 μm, an adverse influence is exerted on the surface shape, so that a smooth sliding surface cannot be obtained. The Bi alloy contains one kind or a plurality of kinds of silver, tin, zinc, and indium of 0.5 to 30 percent by mass, preferably 5 to 15 percent by mass, with respect to pure Bi. Therefore, the Bi alloy has improved wear resistance because it is harder than pure Bi.

In the invention described in a fifth aspect, the sliding layer contains 0.1 to 10 percent by volume of an inorganic compound having Mohs' hardness of 4 or less. The inorganic compound is an alkaline earth metallic salt consisting of phosphate, carbonate, silicate, sulfate, etc. represented by calcium phosphate, calcium carbonate, magnesium silicate, and calcium sulfate, respectively. As an alkaline earth metal, in addition to the above-described calcium (Ca) and magnesium (Mg), beryllium (Be), strontium (Sr), barium (Ba), and lanthanum (La) may be mentioned. The alkaline earth metallic salt has an effect of improving the anti-seizure property and an effect of forming a transfer film. If the ratio of the alkaline earth metallic salt to the total quantity of sliding layer composition is lower than 0.1 percent by volume, sufficient frictional abrasion properties cannot be anticipated, and if it exceeds 10 percent by volume, the wear resistance decreases suddenly. Also, the particle diameter of the alkaline earth metallic salt is preferably 0.1 to 20 μm. If it is smaller than 0.1 μm, sufficient frictional abrasion properties cannot be obtained. If it exceeds 20 μm, an adverse influence is exerted on the surface shape, so that a smooth sliding surface cannot be obtained. Also, if the Mohs' hardness exceeds 4, the mating member is liable to be damaged.

In the invention described in a sixth aspect, a bonding layer formed of a thermosetting resin is provided between the base material and the sliding layer. By providing the bonding layer, which is formed of a thermosetting resin having a high bonding force, between the base material and the sliding layer, the adhesion of the sliding layer to the base material can further be improved, the occurrence of separation of the sliding layer can be prevented, and also the separation caused by micro-vibrations of adhesion interface can be restrained by improving the adhesion between the base material and the sliding layer. As the thermosetting resin, PAI, PI, EP, and phenolic resin are preferable.

In the invention described in a seventh aspect, the above-described sliding member is used for a swash plate of a swash plate type piston pump. By adopting this structure, even if the sliding member is used in a dry state, the mating member can slide for a longer period of time, and also the damage and breakage of the base material and a sudden rise in temperature of the sliding surface can be prevented. Therefore, the swash plate type piston pump can be used under severe conditions such as non lubricant, high speed, and high load.

Figure 1:
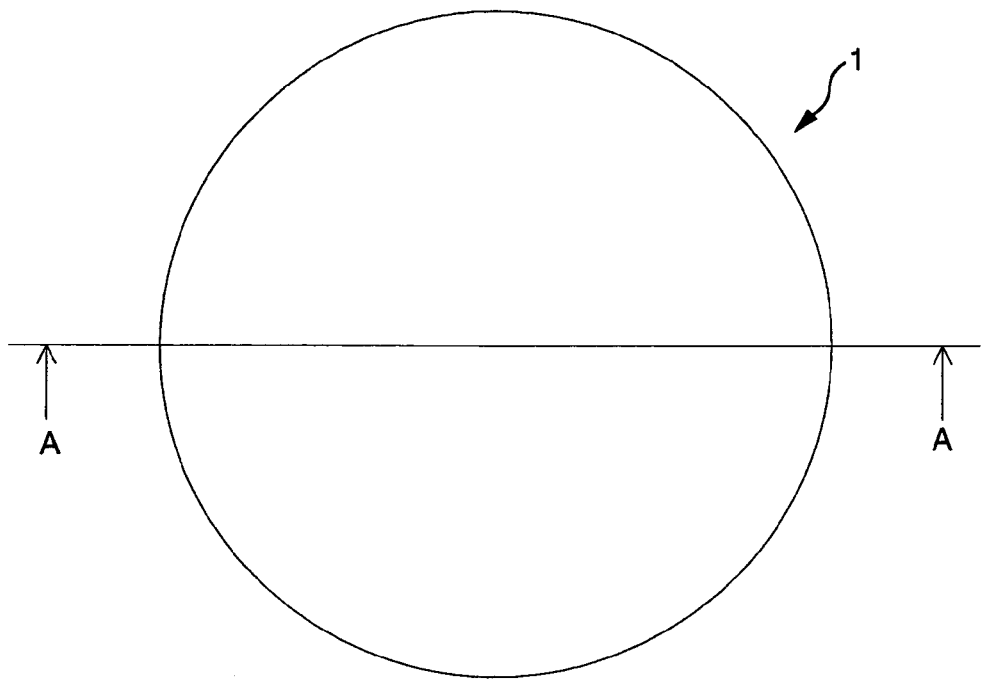
FIG. 1 is a plan view showing an outline of a sliding member in accordance with an embodiment of the present invention.

In the above figures, reference numerals denote the following elements.

1: Sliding member
2: Base material
3: Sliding layer
4: Chemical conversion coat
5: Bonding layer
20: Swash plate type compressor
22: Cylinder
29: Swash plate
30: Piston

DESCRIPTION OF PREFERRED EMBODIMENTS

Figure 2:
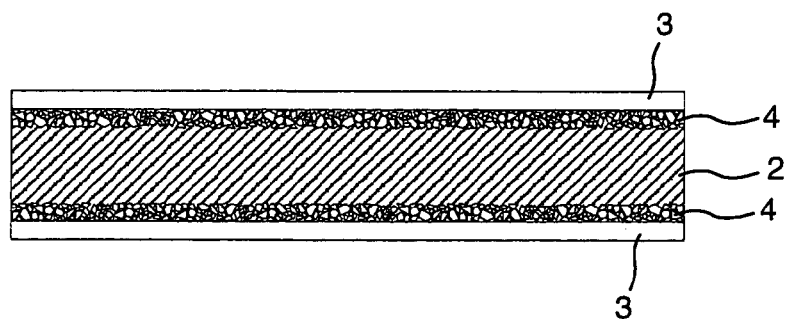
FIG. 2 is a sectional view taken along the line A—A of FIG. 1.

An embodiment of the present invention will now be described with reference to FIGS. 1 to 3. FIG. 1 is a plan view showing an outline of a sliding member 1 in accordance with an embodiment of the present invention, and FIGS. 2 and 3 are sectional views taken along the line A—A of FIG. 1.

The sliding member 1 is made up of a plate-shaped base material 2 formed of any of steel, stainless steel, copper-based alloy, aluminum-based alloy, and magnesium-based alloy and sliding layers 3 provided on both surfaces of the base material 2. The sliding layer 3 is formed so as to contain PBI and 1 to 70 vol % of a solid lubricant.

The surfaces of the base material are subjected to a chemical conversion coating. Therefore, in the sectional views of FIGS. 2 and 3, a chemical conversion coat 4 is formed on both surfaces of the base material 2, and the sliding layer 3 is provided on the surface of the chemical conversion coat 4. As the chemical conversion coat 4, when the base material 2 is formed of steel, a phosphate coat is cited, when it is formed of stainless steel, a Tufftride coating is cited, when it is formed of copper-based alloy, an oxide coat is cited, when it is formed of aluminum-based alloy or magnesium-based alloy, a chromate coat or non-chromate coat is cited. Treatment for forming a zinc phosphate coat on the surface of a steel sheet is briefly explained as an example of chemical conversion coating. A desired chemical conversion coat can be produced on the surface of the base material 2 through treatment processes of degreasing treatment for degreasing a steel sheet by ultrasonic waves or an organic solvent, rinsing treatment for removing the degreasing solution, pickling treatment for removing impurities adhering to the surface and for activating the surface, rinsing treatment for removing the pickling solution, surface conditioning treatment for controlling the formation of crystals of zinc phosphate, surface treatment for producing a chemical conversion coat by chemical reaction (immersed in solution at 80° C. for five minutes), rinsing treatment for removing the unreacted surface treatment solution, and drying treatment for drying treated work.

Figure 3:
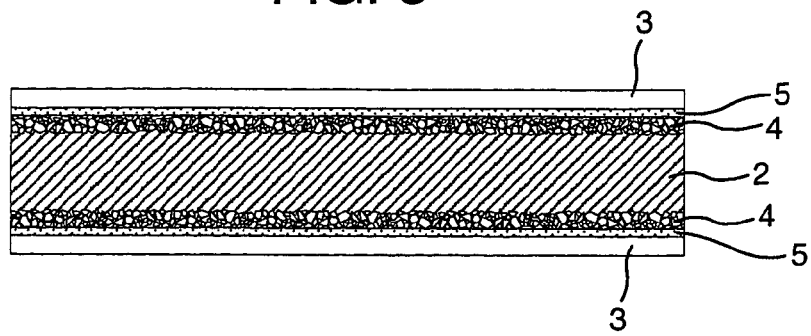
FIG. 3 is a sectional view taken along the line A—A of FIG. 1, which is similar to FIG. 2.

In the sectional view of FIG. 3, a bonding layer 5 formed of a thermosetting resin is provided between the base material 2 and the sliding layer 3, so that the sliding layer 3 is provided on the surface of the chemical conversion coat 4 via the bonding layer 5. As the thermosetting resin, phenolic resin, epoxy resin, polyamide-imide resin, polyimide resin, etc. are preferable. Besides, unsaturated polyester resin, urea resin, melamine resin, silicone resin, alkyd resin, urethane resin, etc. can be used.

On the other hand, the sliding layer 3 has a composition containing PBI, which is a thermoplastic resin, and 1 to 70 vol % of a solid lubricant, such as graphite (Gr), molybdenum disulfide ($MoS_2$), or polytetrafluoroethylene (PTFE), which is added to improve the friction properties, and further contains 0.1 to 10 vol % of Bi or/and Bi alloy or 0.1 to 10 vol % of an alkaline earth metallic salt as an inorganic compound having Mohs' hardness of 4 or less.

For the base material 2 shown in the figures, adhesion between the base material 2 and the sliding layer 3 is improved by producing the crystalline chemical conversion coat 4 on the planar surface of the base material 2, by which the anchoring effect is increased. This anchoring effect strengthens the bonding force between the base material 2 and the sliding layer 3, and thus makes the sliding layer 3 less liable to separate from the base material 2.

The sliding member 1 having the above-described structure is manufactured as described below. After the base material 2 with the chemical conversion coat 4, which has been manufactured through the aforementioned treatment processes, is rinsed and dried, a sliding layer composition (i.e., a mixture of PBI serving as a base resin and a solid lubricant such as $MoS_2$, with Bi or/and Bi alloy or an alkaline earth metallic salt being added as necessary), which is diluted with an appropriate organic solvent, is sprayed on the surface of the base material 2 with an air spray, and then heated and cured at 300 to 400° C. (for example, 350° C.) for 60 minutes. By this heating operation, the solvent is evaporated, and the sliding layer composition containing PBI, the solid lubricant, and the like is cured, by which the sliding layer 3 is provided on the surface of the base material 2. In this case, the sliding layer 3 has a thickness of 1 to 100 μm, preferably 3 to 50 μm.

Figure 4:
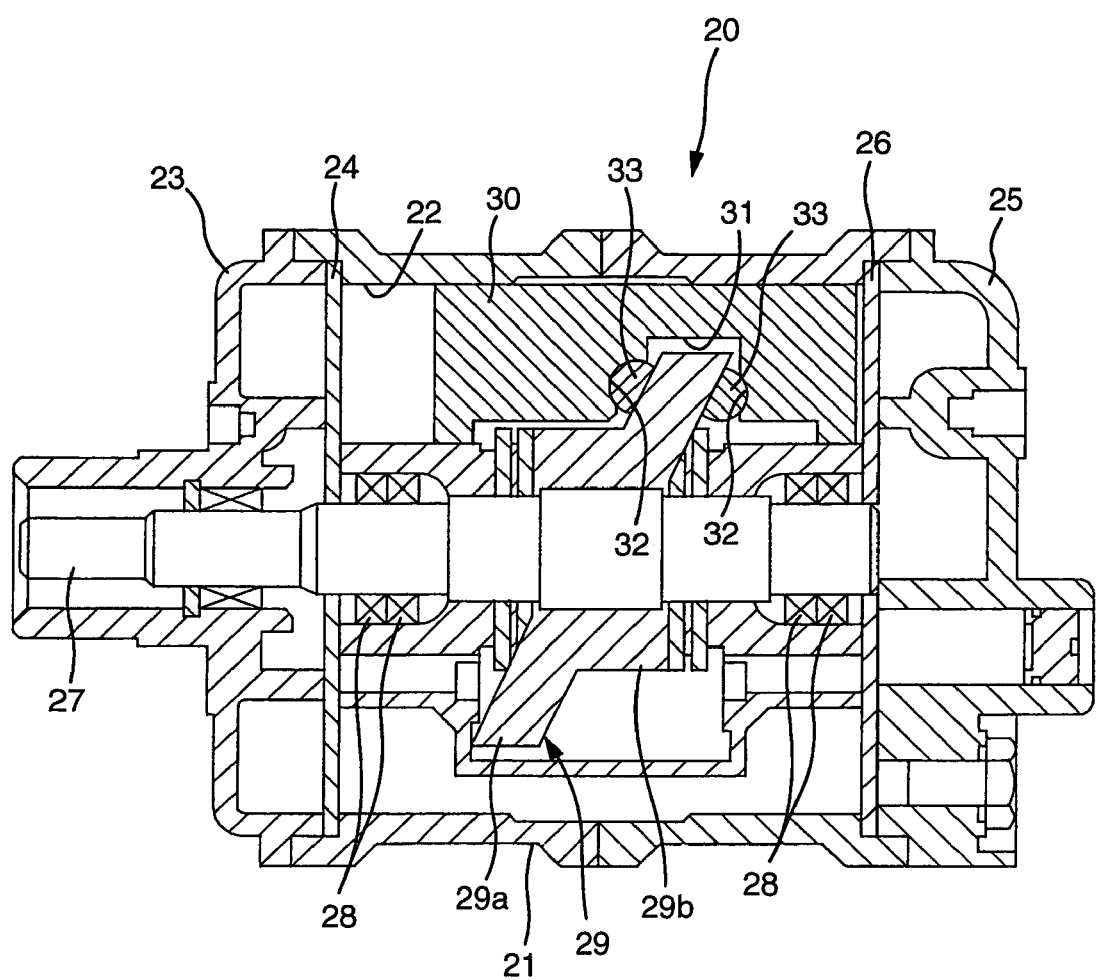
FIG. 4 is a longitudinal sectional view showing an outline of construction of a swash plate type compressor.

Next, as an example of the case where the above-described sliding member 1 is used, a swash plate type compressor 20 is explained with reference to FIG. 4. FIG. 4 is a longitudinal sectional view showing an outline of construction of the swash plate type compressor 20.

The swash plate type compressor 20 compresses a gas in a cylinder 22 by a piston 30 reciprocating in the cylinder 22 following a swash plate 29 rotating in the swash plate type compressor 20. In FIG. 4, the contour of the swash plate type compressor 20 is formed by a cylinder block 21 constituting the outer peripheral portion, a front cylinder head 23 constituting the front side (left-hand side in FIG. 4), and a rear cylinder head 25 constituting the rear side (right-hand side in FIG. 4). Between the cylinder block 21 and the front cylinder head 23 is held a valve plate 24, and between the cylinder block 21 and the rear cylinder head 25 is held a valve plate 26. A part of the space surrounded by the valve plates 24 and 26 and the cylinder block 21 forms the cylinder 22. The cylinder 22 is formed into a cylindrical shape, and a plurality of cylinders 22 are arranged at equal angular intervals around a rotating shaft 27, described later. In the cylinder 22, the piston 30 reciprocating in the cylinder 22 is inserted. The piston 30 is formed into a cylindrical shape like the cylinder 22, and in the cylinder 22, a swash plate inserting portion 31 in which the swash plate 29, described later, is inserted is formed. On the side wall of the swash plate inserting portion 31, a shoe attachment portion 32 is formed to rotatably support a shoe 33 sliding in contact with the swash plate 29.

In the center of the swash plate type compressor 20, the rotating shaft 27 rotated by a driving source (not shown) is pivotally supported by bearings 28. In the substantially central portion of the rotating shaft 27, the swash plate 29, which is an element to which the present invention is applied, is installed with mounting pins (not shown). The swash plate 29 is made up of a boss portion 29b located in the center of the swash plate 29 and a sliding portion 29a with which the shoes 33 are in slidingly contact. The boss portion 29b is formed into a substantially cylindrical shape. The sliding portion 29a is formed into a shape such that a cylinder is cut slantwise, and is formed so as to tilt with respect to the center axis of the boss portion 29b. The diameter of the sliding portion 29a is larger than that of the boss portion 29b. The sliding portion 29a is formed by either of the above-described sliding members 1 shown in FIGS. 2 and 3. Specifically, the sliding layers 3 are formed on both surfaces of the sliding portion 29a, and the mating members, i.e., the shoes 33 are in slidable contact with both of the surfaces.

In a state in which the swash plate 29 is assembled to the swash plate type compressor 20, the sliding portion 29a is installed so as to tilt with respect to the center axis of the rotating shaft 27, and a part of the sliding portion 29a is located in the cylinder 22. A part of the sliding portion 29a, which is located in the cylinder 22, is inserted in the swash plate inserting portion 31 in the piston 30, and the shoes 33 are in contact with both surfaces of a part of the sliding portion 29a as described above. When the rotating shaft 27 is rotated by the driving force of the driving source in this state, the swash plate 29 also rotates, and thus the piston 30 reciprocates in the cylinder 22 following the rotation of the swash plate 29. The gas introduced into the cylinder by suction valves (not shown) provided on the valve plates 24 and 26 is compressed by the piston 30. The compressed gas is discharged from the cylinder 22 through exhaust valves (not shown) provided on the valve plates 24 and 26.

When the piston 30 reciprocates, the sliding portion 29a slides on the shoes 33. At this time, the shoes 33 turn in the shoe attachment portion 32, so that they slides always in contact with the sliding portion 29a. Since the sliding portion 29a is formed by the sliding member 1 as described above, the exposure of the base material 2 and the separation of the sliding layer 3 from the base material 2, which are caused by the wear of the sliding layer 3 of the sliding member 1, are less liable to occur even when the swash plate 29 of the swash plate type compressor 20 rotates at a high speed or when it is subjected to a high load. Also, the damage and breakage of the base material 2 and a sudden rise in temperature of the sliding surface can be prevented, so that the swash plate type compressor 20 can be used under severe conditions such as high speed and high load.

In the above-described swash plate type compressor 20, the shoes 33 do not come into contact with the whole surface of the sliding portion 29a of the swash plate 29. As shown in FIG. 4, on the outer and inner periphery sides of the sliding portion 29a, there are portions with which the shoes 33 do not come into contact. Therefore, the sliding layer 3 need not necessarily be formed on the whole surface of the sliding portion 29a, but may be formed only in the portions with which the shoes 33 come into contact.

Next, tests for evaluating the sliding properties of the sliding member will be described with reference to Tables 1 to 4. The tests were conducted with a thrust type testing machine by using test pieces of sliding members of examples of the present invention and conventional comparative examples.

TABLE 1

| | Sliding layer composition (vol %) | Chemical conversion coat | Seizing surface pressure (MPa) |
|---|---|---|---|
| Comparative example 1 | PAI + 15PTFE + 5MoS$_2$ | Zinc phosphate | 18–21 |
| Comparative example 2 | | None | 15–18 |
| Example 1 | PBI + 15PTFE + 5MoS$_2$ | Zinc phosphate | 24–27 |
| Example 2 | | None | 21–24 |

TABLE 2

| | Test condition | Unit |
|---|---|---|
| Speed | 2 | m/s |
| Surface pressure | Accumulation of 3 MPa every 30 minutes | MPa |
| Lubricating oil | Kerosene | — |
| Lubricating method | Kerosene bath | — |
| Shaft material | JIS S55C (quenched) | — |
| Shaft Roughness | 1 or less | Ry μm |

Seizure judgment time: When back surface temperature of test piece is 140° C. or when frictional force reaches 500 N

TABLE 4

| | Condition |
|---|---|
| Load | Constant after pressure rise until 5 MPa is reached |
| Speed | 2 m/s |
| Test time | 3 min (180 sec) |
| Seizure time | Measurement started after 5 MPa is reached |
| Lubricating condition | Non lubricant |
| Shaft roughness | Ry 1 μm or less |
| Shaft material | JIS S55C quenched |

Seizure judgment time: When back surface temperature of test piece is 180° C. or when frictional force reaches 500 N Table 1 gives test results obtained when tests in lubricating oil were conducted on test pieces of sliding members of examples and comparative examples having different base resin of sliding layer. Table 2 gives conditions for these tests. Table 3 gives test results obtained when tests in a dry state were conducted on test pieces of sliding members of examples and comparative examples having different base resin of sliding layer and different contained components. Table 4 gives conditions for these tests. (The examples and comparative examples in Tables 1 and 3 use a bonding layer formed of PAI+20 vol % MoS$_2$.)

In Table 1, test pieces of examples 1 and 2 relating to sliding members of the present invention were used as test pieces for conducting tests, and test pieces of comparative examples 1 and 2 relating to conventional sliding members were used as test pieces for comparison. On the test pieces of examples 1 and 2 and comparative examples 1 and 2, in test 1 conducted under the test conditions given in Table 2, the seizing surface pressure at the time when a surface pressure of 3 MPa was accumulated every 30 minutes was measured in lubricating oil (kerosene).

In Table 3, test pieces of examples 1 to 6 relating to sliding members of the present invention were used as test pieces for conducting tests, and test pieces of comparative examples 1 and 2 relating to conventional sliding members were used as test pieces for comparison. On the test pieces of examples 1 to 6 and comparative examples 1 and 2, in test 2 conducted under the test conditions given in Table 4, the seizure time after the load reached 5 MPa was measured and the cause for seizure was investigated in a dry state in which lubricating oil was not supplied. Specifically, test 2 examined time and cause for occurrence of seizure caused by a

TABLE 3

| | Sliding layer composition (vol %) | Chemical conversion coat | Time until seizure | Cause for seizure |
|---|---|---|---|---|
| Comparative example 1 | PAI + 15PTFE + 5MoS$_2$ | Zinc phosphate | 78 sec | Torque |
| Comparative example 2 | | None | 72 sec | Torque |
| Example 1 | PBI + 15PTFE + 5MoS$_2$ | Zinc phosphate | 132 sec | Temperature |
| Example 2 | | None | 128 sec | Temperature |
| Example 3 | PBI + 30PTFE + 5MoS$_2$ | None | 150 sec | Temperature |
| Example 4 | PBI + 5PTFE + 15MoS$_2$ | | 180 sec and longer | Not seizing |
| Example 5 | PBI + 30PTFE + 5MoS$_2$ + 5Bi | | 180 sec and longer | Not seizing |
| Example 6 | PBI + 30PTFE + 5MoS$_2$ + 5CaCo$_3$ | | 180 sec and longer | Not seizing | high load applied to the sliding surface at the time of sliding in a dry state. The time for judgment of seizure is as given in Tables 2 and 4.

In Table 1, in comparative example 1, a zinc phosphate coat was produced on the base material 2 as a chemical conversion coat, and the sliding layer 3 in which 15 vol % PTFE (polytetrafluoroethylene) and 5 vol % $MoS_2$ used as solid lubricants were mixed with PAI (polyamidimide) used as a base resin was provided on the surface of the chemical conversion coat. In comparative example 2, no chemical conversion coat was produced on the base material 2, and the sliding layer 3 having the same composition as that of comparative example 1 was provided on the surface of the base material 2. On the other hand, in example 1, a zinc phosphate coat was produced on the base material 2 as a chemical conversion coat, and the sliding layer 3 in which 15 vol % PTFE and 5 vol % $MoS_2$ used as solid lubricants were mixed with PBI (polybenzimidazole) used as a base resin was provided on the surface of the chemical conversion coat. In example 2, no chemical conversion coat was produced on the base material 2, and the sliding layer 3 having the same composition as that of example 1 was provided on the surface of the base material 2. The difference between comparative examples 1 and 2 and the difference between examples 1 and 2 are whether or not a chemical conversion coat is produced on the base material 2, and the difference between comparative examples 1 and 2 and examples 1 and 2 is that the base resin of the sliding layer 3 is PAI or PBI.

Comparing comparative examples 1 and 2 using PAI as a base resin, which relate to the conventional sliding members, comparative example 1 in which the chemical conversion coat 4 was produced on the base material 2 has a slightly higher seizing surface pressure than comparative example 2 in which the chemical conversion coat 4 was not produced. Similarly, comparing examples 1 and 2 using PBI as a base resin, which relate to sliding members of the present invention, example 1 in which the chemical conversion coat 4 was produced on the base material 2 has a slightly higher seizing surface pressure than example 2 in which the chemical conversion coat 4 was not produced. This shows that the sliding member in which the chemical conversion coat 4 is produced on the base material 2 exhibits higher sliding properties. Also, paying attention to the base resin, examples 1 and 2 using PBI has a higher seizing surface pressure than comparative examples 1 and 2 using PAI. This shows that the sliding member using PBI as a base resin exhibits higher sliding properties.

In Table 3, comparative examples 1 and 2 and examples 1 and 2 are the same test pieces as those given in Table 1. In example 3, no zinc phosphate coat was produced on the base material 2 as the chemical conversion coat 4, and the sliding layer 3 in which 30 vol % PTFE and 5 vol % $MoS_2$ used as solid lubricants were mixed with PBI used as a base resin was provided on the surface of the base material 2. In example 4, no zinc phosphate coat was produced on the base material 2 as the chemical conversion coat 4, and the sliding layer 3 in which 5 vol % PTFE and 15 vol % $MoS_2$ used as solid lubricants were mixed with PBI used as a base resin was provided on the surface of the base material 2. In example 5, no zinc phosphate coat was produced on the base material 2 as the chemical conversion coat 4, and the sliding layer 3 in which 30 vol % PTFE and 5 vol % $MoS_2$ used as solid lubricants, and 5 vol % Bi were mixed with PBI used as a base resin was provided on the surface of the base material 2. In example 6, no zinc phosphate coat was produced on the base material 2 as the chemical conversion coat 4, and the sliding layer 3 in which 30 vol % PTFE and 5 vol % $MoS_2$ used as solid lubricants, and 5 vol % $CaCO_3$ used as an inorganic compound were mixed with PBI used as a base resin was provided on the surface of the base material 2.

Comparing comparative examples 1 and 2 using PAI as a base resin, which relate to the conventional sliding members, comparative example 1 in which the chemical conversion coat 4 was produced on the base material 2 has slightly longer seizure time than comparative example 2 in which the chemical conversion coat 4 was not produced. Similarly, comparing examples 1 and 2 using PBI as a base resin, which relate to sliding members of the present invention, example 1 in which the chemical conversion coat 4 was produced on the base material 2 has slightly longer seizure time than example 2 in which the chemical conversion coat 4 was not produced. This shows that the sliding member in which the chemical conversion coat 4 is produced on the base material 2 exhibits higher sliding properties. Also, paying attention to the base resin, examples 1 and 2 using PBI has considerably longer seizure time than comparative examples 1 and 2 using PAI. This shows that the sliding member using PBI as a base resin exhibits higher sliding properties. In comparative examples 1 and 2 using PAI, which relate to the conventional sliding members, as the result of sliding test, the whole of the sliding layer 3 was worn and hence the base material 2 was exposed, and thus the torque reached 500 N·m, and time for reaching this torque was as given in Table 3. On the other hand, in examples 1 and 2 using PBI, which relate to sliding members of the present invention, as the result of sliding test, the whole of the sliding layer 3 was not worn and the back surface temperature of test piece reached 180° C. due to frictional heat of sliding in the sliding layer 3, and time for reaching this temperature was as given in Table 3.

In example 3, the content of PTFE used as a component of solid lubricant for the sliding layer 3 was doubled as compared with example 2. In this case, time for the back surface temperature of test piece to reach 180° C. was slightly longer than that of example 2. Also, in example 4, as components of solid lubricant for the sliding layer 3, the content of PTFE was decreased and the content of $MoS_2$ was increased, the sum of the contents being the same, as compared with example 2. In this case, the back surface temperature of test piece did not reach 180° C. even when the test time of 180 seconds had elapsed.

Further, in examples 5 and 6, the component ratio of solid lubricants for the sliding layer 3 was the same, but Bi or $CaCO_3$, which is an inorganic compound, was added as a component of sliding layer as compared with example 3. In this case, the back surface temperature of test piece did not reach 180° C. even when the test time of 180 seconds had elapsed. From this fact, it can be understood that the sliding properties can be improved by adding Bi or the inorganic compound to the sliding layer 3.

In examples 3 to 6 in Table 3, the sliding members in which the chemical conversion coat 4 is not produced on the base material 2 are shown. In the experiment conducted by the applicant, for the test pieces in which the chemical conversion coat 4 was produced on the base material 2, and the sliding layer 3 having the same components as those in examples 3 to 6 was provided on the surface of the chemical conversion coat 4, the back surface temperatures of all test pieces did not reach 180° C. even when the test time of 180 seconds had elapsed. In Tables 1 and 3, test pieces in which the bonding layer 5 is provided between the base material 2 and the sliding layer 3 are not shown. When tests were conducted on the test pieces in which the bonding layer 5 was provided between the base material 2 and the sliding layer 3, for the test pieces provided with the sliding layer 3 having the same components as those in examples 3 to 6, the back surface temperatures of all test pieces did not reach 180° C. even when the test time of 180 seconds had elapsed.

TABLE 5

| Base material | Type of base material treatment | Sliding layer composition (vol %) | Bonding layer | Bonding strength (MPa) |
|---|---|---|---|---|
| JIS S45C | No treatment | PBI + 5PTFE + 15MoS$_2$ | Absent | 14 |
|  |  | PBI + 5PTFE + 15MoS$_2$ | Present | 21 |
|  | Shotblasting | PBI + 5PTFE + 15MoS$_2$ | Present | 23 |
|  | Zinc phosphate coating | PBI + 5PTFE + 15MoS$_2$ | Present | 27 |

Table 5 gives values measured in bonding strength tests conducted to examine the bonding strength of sliding members provided with the bonding layer 5. The bonding strength test was conducted as described below. A test piece measuring 20 mm×50 mm was prepared by coating the surface of a base material formed of JIS S45C with sliding layer compositions mixed at a predetermined ratio so as to provide a predetermined thickness with or without a bonding layer, a columnar iron rod (diameter: 8 to 10 mm) was bonded to the coated surface of test piece with an epoxy-based adhesive and the adhesive was dried and cured, and after curing, the test piece in which the adhesive swelling out from the bonding portion had been trimmed was subjected to a tensile test of 5 mm/min. By dividing the value measured at this time by the cross-sectional area of the columnar iron rod, the bonding strength (unit: MPa) was obtained.

As shown in Table 5, in the case where the bonding layer 5 is not provided between the base material 2 whose surface is not subjected to surface treatment and the sliding layer 3, the bonding strength is the lowest. The bonding strength increases in the order of the case where the bonding layer 5 is provided between the base material 2 whose surface is not subjected to surface treatment and the sliding layer 3, the case where the bonding layer 5 is provided between the base material 2 whose surface is subjected to shotblasting and the sliding layer 3, and the case where the bonding layer 5 is provided between the base material 2 whose surface is subjected to zinc phosphate coating and the sliding layer 3. Thus, by producing the chemical conversion coat 4 on the surface of the base material 2, adhesion between the base material 2 and the sliding layer 3 is improved, by which the anchoring effect can be increased.

As is apparent from the above description, in the invention described in a first aspect, polybenzimidazole, which is a thermoplastic resin, has higher heat resistance and also has higher material strength than the conventionally used thermosetting resin, so that the wear resistance and the anti-seizure property can be improved and a decrease in material strength caused by high-temperature atmosphere, heat generation at the time of sliding, etc. can be restrained. Furthermore, the initial conformability can be improved because of high elongation percentage. Also, since the sliding layer contains a solid lubricant, the coefficient of friction can be decreased, and hence the anti-seizure property can be enhanced. Also, as in the invention described in a third aspect, as the solid lubricant, at least one kind of polytetrafluoroethylene, graphite, and molybdenum disulfide is preferably used.

In the invention described in a second aspect, adhesion between the base material and the sliding layer is improved, by which the anchoring effect is increased, and also the anti-seizure property and other sliding properties can be improved by a coat produced by the chemical conversion coating even when the sliding layer is worn and hence the base material is exposed.

In the invention described in a fourth aspect, an effect of improving the anti-seizure property and an effect of forming a transfer coat are achieved.

In the invention described in a fifth aspect, an effect of improving the anti-seizure property and an effect of forming a transfer film are achieved.

In the invention described in a sixth aspect, the adhesion of the sliding layer to the base material can further be improved, the occurrence of separation of the sliding layer can be prevented, and also the separation caused by microvibrations of adhesion interface can be restrained by improving the adhesion between the base material and the sliding layer.

In the invention described in a seventh aspect, even if the sliding member is used in a dry state, the mating member can slide for a longer period of time, and also the damage and breakage of the base material and a sudden rise in temperature of the sliding surface can be prevented. Therefore, a swash plate type piston pump to which the sliding member in accordance with the present invention is applied can be used under severe conditions such as non lubricant, high speed, and high load.

What is claimed is:

1. A sliding member in which a sliding layer is provided on a surface of a base material formed of any of steel, stainless steel, copper-based alloy, aluminum-based alloy, and magnesium-based alloy, said sliding layer containing polybenzimidazole and 1 to 70 percent by volume of a solid lubricant, wherein the sliding layer contains 0.1 to 10 percent by volume of bismuth or/and bismuth alloy.

2. The sliding member according to claim 1, wherein the surface of said base material is subjected to a chemical conversion coating, and said sliding layer is provided on the chemical conversion coated surface.

3. The sliding member according to claim 2, wherein said solid lubricant is formed of at least one kind of polytetrafluoroethylene, graphite, and molybdenum disulfide.

4. The sliding member according to claim 3, wherein said sliding layer contains 0.1 to 10 percent by volume of an inorganic compound having Mohs' hardness of 4 or less.

5. The sliding member according to claim 4, wherein a bonding layer formed of a thermosetting resin is provided between said base material and said sliding layer.

6. The sliding member according to claim 4, wherein said sliding member is used for a swash plate of a swash plate type piston pump.

7. The sliding member according to claim 4, wherein a bonding layer formed of a thermosetting resin is provided between said base material and said sliding layer.

8. The sliding member according to claim 4, wherein said sliding member is used for a swash plate of a swash plate type piston pump.

9. The sliding member according to claim 3, wherein said sliding layer contains 0.1 to 10 percent by volume of an inorganic compound having Mohs' hardness of 4 or less.

10. The sliding member according to claim 2, wherein said sliding layer contains 0.1 to 10 percent by volume of an inorganic compound having Mohs' hardness of 4 or less.

11. The sliding member according to claim 2, wherein a bonding layer formed of a thermosetting resin is provided between said base material and said sliding layer.

12. The sliding member according to claim 2, wherein said sliding member is used for a swash plate of a swash plate type piston pump.

13. The sliding member according to claim 1, wherein said solid lubricant is formed of at least one kind of polytetrafluoroethylene, graphite, and molybdenum disulfide.

14. The sliding member according to claim 1, wherein said sliding layer contains 0.1 to 10 percent by volume of an inorganic compound having Mohs' hardness of 4 or less.

15. The sliding member according to claim 1, wherein a bonding layer formed of a thermosetting resin is provided between said base material and said sliding layer.

16. The sliding member according to claim 1, wherein said sliding member is used for a swash plate of a swash plate type piston pump.

17. The sliding member according to claim 15, wherein said sliding member is used for a swash plate of a swash plate type piston pump.

* * * * *